Figure 1:
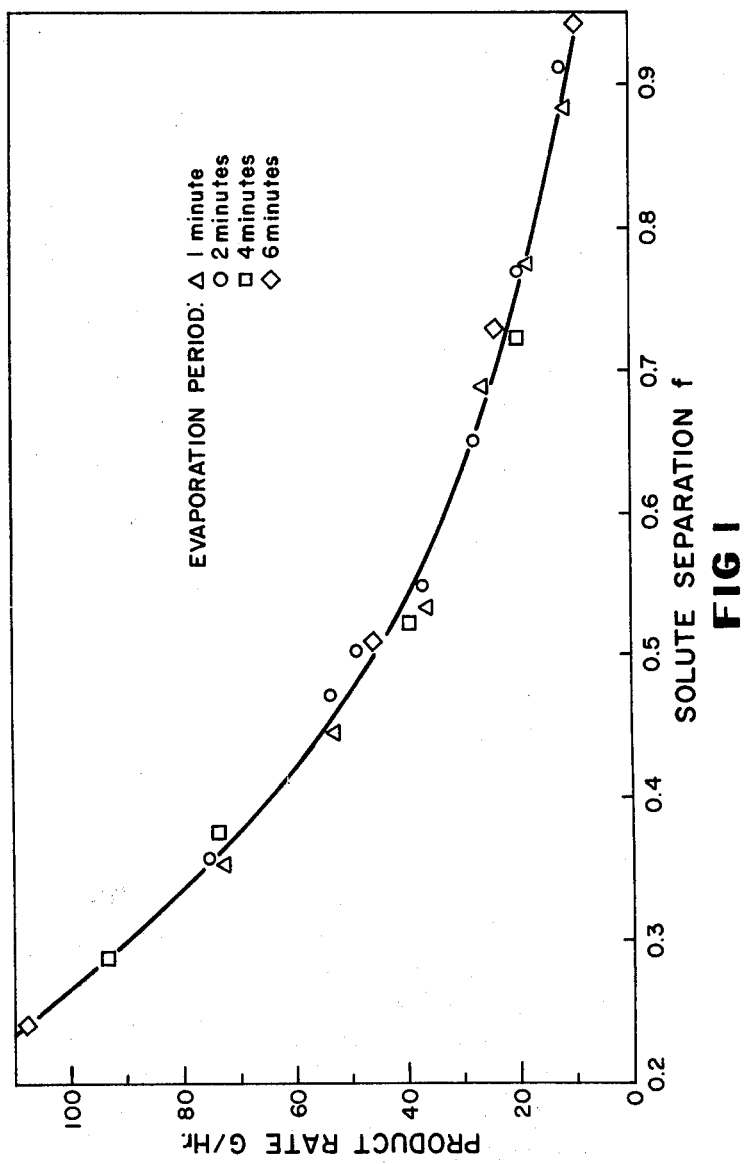

United States Patent [19]

Kunst et al.

[11] 4,062,782

[45] Dec. 13, 1977

[54] REVERSE OSMOSIS MEMBRANES

[75] Inventors: Branko Kunst, Zagreb, Yugoslavia; Srinivasa Sourirajan, Ottawa, Canada

[73] Assignee: Canadian Patents and Development Ltd, Canada

[21] Appl. No.: 637,419

[22] Filed: Dec. 3, 1975

Related U.S. Application Data

[63] Continuation of Ser. No. 109,794, Jan. 26, 1971, abandoned.

[30] Foreign Application Priority Data

Feb. 26, 1970 Canada .................. 075959

[51] Int. Cl.² ............................................ B01D 31/00
[52] U.S. Cl. .................................. 210/500 M; 264/49
[58] Field of Search ............. 210/500 M, 490; 264/41, 264/46, 49

[56] References Cited

U.S. PATENT DOCUMENTS

| | | | |
|---|---|---|---|
| 3,133,132 | 5/1964 | Loeb et al. | 264/49 |
| 3,133,137 | 5/1964 | Loeb et al. | 264/41 |
| 3,283,042 | 11/1966 | Loeb et al. | 264/49 |
| 3,429,957 | 2/1969 | Merten | 210/500 X |
| 3,446,359 | 5/1969 | Loeb et al. | 210/490 |
| 3,524,757 | 8/1970 | Havens | 117/95 |
| 3,567,810 | 3/1971 | Baker | 264/41 |
| 3,592,953 | 7/1971 | Ward et al. | 264/46 |
| 3,662,046 | 5/1972 | Woo et al. | 210/500 X |

OTHER PUBLICATIONS

Banks et al., "Studies on Desalination by Reverse Osmosis," from J. Applied Chem., vol. 16, Mar., 1966, pp. 94-99.

Primary Examiner—Frank A. Spear, Jr.
Attorney, Agent, or Firm—Stevens, Davis, Miller & Mosher

[57] ABSTRACT

The present invention relates to the production of a novel membrane having a larger number of small sized pores therein such that the product rate in a reverse osmosis separation using said membrane is substantially increased for a particular separation factor. The invention is predicated upon the concept that the performance of a membrane in reverse osmosis separation is primarily dependent upon two interrelated factors, namely the structure of the polymer solution from which the film is cast and the evaporation rate during the period of evaporation of the organic solvent from the cast film. The present invention thus provides processes in which the solvent structure of the solution and the evaporation rate of the solution from the cast film is adjusted towards an optimum for producing a large number of small pores in the surface layer of the membrane to increase substantially the product rate at a given separation factor.

16 Claims, 11 Drawing Figures

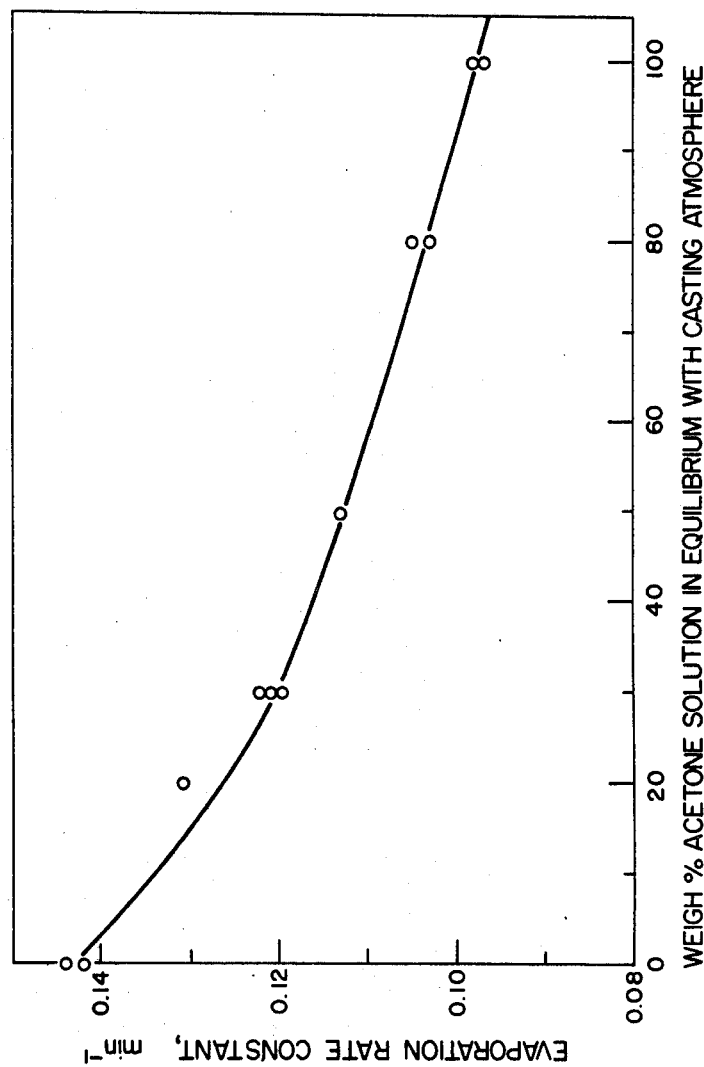

REVERSE OSMOSIS MEMBRANES

This is a continuation of application Ser. No. 109,794 filed Jan. 26, 1971, now abandoned.

The present invention relates to porous reverse osmosis membranes and in particular to such membranes which in a reverse osmosis separation of a solvent from a solution have substantially increased product rate, i.e. permeability for said solvent, without substantial reduction in its separation factor i.e. its ability to separate the solvent from the solution. The present invention also provides a process for the production of the membranes referred to above particularly when operating at low pressures of for example 600 p.s.i. or less and more particularly 300 p.s.i. or less.

Reverse osmosis processes for the separation of solvents from solutions such as the separation of water from aqueous solutions of inorganic salts are known. A typical process involves feeding the solution to one particular side of the reverse osmosis membrane at a pressure exceeding the osmotic pressure difference across said membrane, the solvent e.g. water being preferentially forced through the membrane, which is capable of preferentially rejecting the solute, e.g. the dissolved salt and the solvent is collected from the other side of the membrane separately from the concentrated solution. Reverse osmosis separation has particular application to the demineralization (desalination) of sea water and such application is disclosed for example in U.S. Pat. Nos. 3,250,701 and 3,555,382 where sea water is fed to the reverse osmosis membrane under pressure. While the membranes of the present invention are primarily useful in the demineralization of saline brackish or sea waters, as is known reverse osmosis separation is generally applicable to the separation of solvents from solutions, such as inorganic salts or organic substrates in water and organic substrates in organic solvents, the condition of separation being determined by inter alia the membranes selected and the pressure applied depending upon the particular solution from which the solvent is to be separated.

As disclosed in U.S. Pat. No. 3,250,701, it has been found for the separation of water from aqueous solutions containing inorganic salts such as sea water that porous cellulose ester membranes are particularly suitable in that although relatively high pressures are necessary in the reverse osmosis separation of the order of 600 to 1500 pounds per square inch, the salt rejection, i.e., the separation factor is high and the product rate, i.e. the rate of permeation of the water through the membrane is good. Particularly suitable membranes for use in the separation of solvents from solutions, particularly in the de-salination of saline waters, as well as their preparation are the asymmetric porous cellulose acetate membranes disclosed inter alia in U.S. Pat. Nos. 3,133,132 and 3,133,137 as well as Sourirajan, S. Ind. Eng. Chem. Fundamentals 2, 51 (1963) and Loeb, S. and S. Sourirajan, Advan. Chem. Ser. No. 38, 117 (1963).

In particular, in U.S. Pat. No. 3,133,132 there is disclosed a method of preparing a porous membrane adapted to separate solvents from solutions comprising dissolving a film forming cellulosic ester and an aqueous solution of a pore producing agent in an organic solvent, casting the solution to form a membrane of substantially uniform thickness, evaporating a portion of the organic solvent for predetermined periods of time, said casting and evaporating being accomplished with said solution cooled below room temperature and immersing the cast membrane in water to remove the pore producing agent. The pore producing agent is suitably a perchlorate such as magnesium or sodium perchlorate or formamide. The cellulosic ester is suitably cellulose acetate or cellulose acetate butyrate, particularly cellulose acetate and the organic solvent may preferably be methyl-ethyl-ketone, acetone, ethanol or methanol. The solution may be cooled to a temperature in the range $-7.5°$ to $-16°$ C. before casting at that temperature. In the production of particular asymmetric cellulose acetate reverse osmosis membranes according to the aforesaid process, the film casting solution containing cellulose acetate dissolved in acetone has an additive such as an aqueous solution of magnesium perchlorate which is soluble in water and does not adversely affect the solubility of cellulose acetate in acetone added thereto. Membranes are cast on flat glass plates or in glass or metal tubes from the above solution at ambient or lower temperatures and after casting part of the solvent is allowed to evaporate in air from the surface of the membrane. This is followed by immersing the membrane in ice cold water for at least an hour during which time gelation occurs and the additive is leached out leaving a tough solid porous asymmetric membrane on the plate or tube from which the membrane can easily be removed. While membranes cast in the above manner are found in reverse osmosis separation to give very high product rate, there is very little solute separation, i.e. a lower separation factor and it has also been disclosed in U.S. Pat. No. 3,133,132 that solute separation in reverse osmosis separation using the membrane can be progressively increased by heating the membrane in water for short periods of time. Thus it is found that on progressively increasing the shrinkage temperature, solute separation particularly with reverse osmosis of saline solutions can be increased but at the same time product rate decreases. Thus, in U.S. Pat. No. 3,133,132 the membrane is suitably shrunk by heating in warm water to a temperature in the range 77° to 83° C. and held at that temperature for at least an hour. In U.S. Pat. No. 3,133,137 the shrinkage procedure is improved by immersing the membrane in hot water at a temperature from 84° to 90° C. for a period of from 18 minutes to 30 seconds depending upon the temperature to obtain the shrinkage of the membrane.

Further it has also been found that the separation factor $f$ of the membrane which is used herein is defined $$f = \frac{\text{(molality of solute in feed solution)} - \text{(molality of solute in product solution)}}{\text{(molality of solution in feed solution)}}$$

and the product rate for a particular membrane may also be stabilized i.e. the membrane can be used in reverse osmosis with reproducible results by subjecting the porous cellulose acetate membrane to a pressure treatment before using the membrane in reverse osmosis for a separation of the solvent from solution, which pressure treatment comprises pumping a liquid such as a solvent, e.g. distilled water over the surface of the membrane subsequently contacted with the solution in the reverse osmosis separation at a pressure of about 15% higher than the maximum operating pressure applied during the reverse osmosis separation for at least one hour.

In U.S. Pat. No. 3,283,042 a similar process of forming the porous membrane is effected, the film forming material being a cellulose ether or ester derivative having the formula:

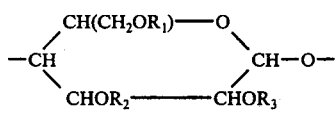

wherein each of $R_1$, $R_2$ and $R_3$ is hydrogen, $R_4$ or $CR_5O$ where $R_4$ is an alkyl group containing 1 to 8 carbon atoms and $R_5$ is an alkyl group containing 1 to 7 carbon atoms. Specific examples of such cellulose derivatives are cellulose acetate, cellulose acetate butyrate, cellulose propionate and ethyl cellulose. The pore producing additive in the process of the patent have an anion selected from iodide, bromide, tetraphenyl boron, salicylate, chlorate, tetraiodomercurate and fluorosilicate. In addition preferably a different pore regulating inorganic compound is also dissolved in the organic solvent which has an anion selected from halides and oxygenated halides. Such pore producing compounds include anhydrous cadmium bromide, hydrated cadmium bromide, potassium iodide, sodium iodide, sodium tetraphenyl boron, sodium salicylate, sodium chlorate and potassium tetraiodomercurate and magnesium perchlorate. The additional pore regulating compound includes sodium chloride, sodium bromide, sodium iodide, sodium chlorate, hydrochloric acid, magnesium chloride, lithium chloride and aluminum chloride. The organic solvent may also include, in addition to acetone, methyl ethyl ketone, ethyl alcohol, and methyl alcohol, acetic and formic acid.

Many attempts have been made to increase the permeability of the above known reverse osmosis membranes to the solvent, i.e. increase the product rate while at the same time substantially maintaining the separation factor of the membrane in the reverse osmosis separation, such processes being disclosed for example in U.S. Pat. Nos. 3,536,612; 3,250,701 and 3,355,382.

The present invention provides an improved porous membrane for use in reverse osmosis processes which has improved product rate for the solvent for essentially the same separation factor as compared with the product rate using a porous membrane provided by the processes in, for example, U.S. Pat. Nos. 3,133,132; 3,133,137 and 3,283,042, particularly when the reverse osmosis process is effected at relatively low pressures.

It has now been found that the product rate i.e. the permeability of the membrane to solvent flow at a given separation factor in the reverse osmosis process, particularly in the demineralization of saline waters is dependent primarily on two interrelated factors in the casting process for the production of the membranes and in particular is dependent upon the structure of the solution from which the membrane is cast and the evaporation rate of the volatile solvent from the cast membrane during the period of evaporation of the volatile solvent from the cast membrane before gelation of the membrane in cold water.

The term "structure of the solution" as used herein refers particularly to the temperature of the solution and the composition of the solution. Thus, according to one aspect of the present invention it has been found that the product rate of the membrane for a particular separation factor is dependent upon the aforesaid structure of the solution from which the membrane is cast i.e. the composition of the solution and the temperature of the solution. Thus it is believed that the product rate of the membrane is dependent upon the number of pores in the surface layer of the membrane and the separation factor is dependent upon the size of such pores in the surface layer of the membrane and thus it is necessary, in order to improve the performance of the membrane in reverse osmosis separation, to produce a membrane containing a large number of small size pores, the larger the number of pores in the surface layer, the better the product rate for a particular separation factor. In the solution from which the membrane is cast it is believed that the polymer, i.e. the cellulose ester or ether is present in the form of supra molecular particles or aggregates, this concept having been disclosed for example, by V. I. Klenin and N. K. Kolnibolotchuk, Mekh, Protseffov, Plenkoovrasov, Polim. Rastvorov. Dispersii, Akad. Nauk S.S.R., Sb. statei 1966, 32 – 57 (Russ), see also Chem. Abstracts, Vol. 67, 1967 Nos. 91797N, 91798P, 91799Q and 91800H. It is further believed that the larger the supra molecular aggregates in the casting solution, the smaller will be the number of pores produced in the surface layer of the cast membrane and thus the lower will be the product rate obtained in reverse osmosis processes for a particular separation factor. Thus, applicants have found that by lowering either the concentration of the polymer in the casting solution from which the film is to be cast and by raising the temperature of the solution, the size of the supra molecular particle or aggregate of the polymer, i.e. the film forming compound in the solution is reduced and the product rate of the cast membrane is substantially increased for a particular separation factor. According to the present invention therefore there is provided in the production of a porous membrane for use in the separation of solutes from solvents by reverse osmosis which comprises dissolving a film forming cellulosic ester or ether and a water soluble pore producing compound in a volatile organic solvent to form a casting solution, casting said solution to form a membrane of substantially uniform thickness, evaporating a portion of said organic solvent from said cast membrane and immersing said cast membrane in cold water to effect gelation thereof and removal of the pore producing compound therefrom, the improvement in which during said casting the temperature of the casting solution is maintained sufficiently high and the concentration of the film forming compound in the casting solution is maintained sufficiently low to substantially lower the size of the supra molecular particles of the film forming compound in the solution whereby to produce a membrane capable of allowing a substantially higher product rate during reverse osmosis separation at essentially the same separation factor.

There is clearly a limit by which the size of the aggregates of the film forming compound may be lowered and the minimum size of the aggregates is determined by the capability of the solution to form a film on casting in the aforesaid process. Thus the minimum concentration of the film forming compound in the solution will depend to a great extent on the precise nature of the film forming compound and the other components of the solution and also the temperature of the solution but in general the film forming compound should be present in an amount of at least about 10% by weight. Preferably the maximum concentration of the film forming compound is not above 20% by weight as it is found that membranes cast from such a solution have substantially improved product rates and particular separation factors over the membranes of the prior art.

The temperature of the casting solution is desirably at least 0° C. and has an upper limit once again determined by the ability of the solution to be cast into a membrane in the aforesaid process, and in addition the upper limit is dependent upon the volatility of the solvent such as to provide a sufficient time of evaporation for controlling the evaporation as when the evaporation time becomes very short, such as with acetone above about 30° C., the evaporation rate is difficult to control and preferably the temperature of the solution is from about 10° C. to ambient temperature, i.e. in the range 24° to 27° C. and preferably the temperature of the casting solution is ambient temperature.

As aforesaid the product rate of the cast membrane besides being dependent upon the solution structure is also dependent for a particular solution structure on the evaporation rate of the organic solvent from the cast film before gelation of the film in cold water. In particular, according to another aspect of the present invention it has been found that for a particular casting solution, maintained at a particular temperature i.e. a particular solution structure, there is an optimum rate of evaporation of the solvent from the cast film during the period of evaporation of the solvent from the cast film before gelation of the film in cold water. This optimum evaporation rate provides a reverse osmosis membrane having a high product rate for a particular separation factor, which product rate may be improved to an extent of 100 to 200% over the product rate of the membranes disclosed in the aforesaid U.S. Patents when effecting the desalination of brackish waters by reverse osmosis operating at low pressures of the order of 300 p.s.i. or less.

Heretofore it has been conventional to maintain the temperature of the casting atmosphere, and the temperature of the casting solution essentially the same. However, the evaporation rate of the solvent from the cast film depends primarily upon the temperature of the casting atmosphere and the nature of the casting atmosphere and the temperature of the casting solution is determined primarily by the solution structure. Thus to maintain the temperature of the casting atmosphere the same as the temperature of the casting solution does not necessarily provide the conditions for the optimum evaporation rate of the solvent from the cast membrane, the evaporation rate either being too high or too low. Thus, according to this aspect of the present invention the temperature difference is maintained between the temperature of the casting solution and the temperature of the casting atmosphere so as to either increase or decrease the evaporation rate of the solvent from the cast film towards the optimum evaporation rate conditions, whereby to increase the product rate of the membrane in reverse osmosis separation procedures for an essentially constant separation factor.

According to another aspect of the present invention therefore there is provided in the production of a porous membrane for use in the separation of solutes from solvents by reverse osmosis which comprises dissolving a film forming cellulosic ester or ether and a water soluble pore producing compound in a volatile organic solvent to form a casting solution, casting said solution to form a membrane of substantially uniform thickness, evaporating a portion of said organic solvent therefore and immersing said cast membrane in cold water to effect gelation thereof and removal of said pore producing compound therefore, the improvement in which said membrane is cast into an atmosphere maintained at a temperature different from the temperature of said casting solution so as to adjust the evaporation rate of the solvent from said cast membrane towards an optimum for said membrane casting solution whereby to produce a membrane capable of providing in such reverse osmosis process a substantially higher product rate for essentially the same separation factor.

In a particularly preferred embodiment of the present invention, when the evaporation rate of the solvent from the cast film is below the optimum evaporation rate for the particular casting solution, the temperature of the casting atmosphere is maintained above the temperature of the casting solution. The temperature of the casting solution is desirably at least 0° C for optimum solution structure and the temperature of the casting atmosphere is thus desirably in the range 10° C. to ambient temperature (23°- 27° C.) and preferably is maintained at ambient temperature.

The organic solvent, the pore producing compound and the cellulosic compound may be any of those disclosed in the aforesaid U.S. Patents, the disclosures of which are hereby incorporated by reference. The pore forming material may be, for instance formamide or an aqueous solution of magnesium perchlorate. Preferably the cellulosic compound is a cellulose acetate, the solvent is acetone and the pore producing compound is formamide or magnesium perchlorate. Preferably the magnesium perchlorate is present as an aqueous solution, the water being miscible with the organic solvent e.g. the acetone. The proportions of the various components, i.e. the cellulosic compound, organic solvent and aqueous solution of the pore producing compound may be the same as those disclosed in the aforesaid U.S. Patents, the present invention being predicated in part upon an improved process step, namely maintaining a difference between the temperature of the casting solution and the temperature of the casting atmosphere during the evaporation of the solvent from the cast membrane.

While it is possible to obtain the optimum evaporation rate of the solvent from the cast film by maintaining a difference between the temperature of the casting solution and the casting atmosphere, the evaporation rate of the solvent from the cast form may be adjusted by varying the nature of the casting atmosphere, for example the evaporation rate of solvent from the cast film may be lowered by initially including in the casting atmosphere a vapor of the solvent which is being evaporated from the cast film. While the inclusion of the solvent vapor in the casting atmosphere does not have such a pronounced effect on the evaporation rate as maintaining a temperature difference between the casting atmosphere and the casting solution and, as such, without maintaining such temperature difference does not have a great effect in increasing the production rate of the cast membrane at a particular separation factor as, as will be shown hereinafter, the introduction of solvent vapor into the casting atmosphere does reduce the evaporation rate of the solvent from the cast film to a sufficient extent that it can be used in conjunction with maintaining a difference in temperature between the casting solution and the casting atmosphere to provide for a fine adjustment of the evaporation rate of the solvent from the cast film towards an optimum evaporation rate thus producing an increase in product rate at constant separation factor in the membrane so produced.

For example it has been found with the aforesaid preferred embodiment of the process of the present invention that by including acetone vapor in the casting atmosphere desirably such that it is present in ambient air in an amount at equilibrium with an aqueous acetone solution containing 30 to 80% by weight of acetone, the product rate at a given separation factor of a porous membrane formed from a casting solution of similar composition under otherwise essentially the same conditions can be improved by an amount of 100 to 150% in the desalination of saline waters by reverse osmosis at low pressures suitably not above 250 p.s.i.

While the membranes of the present invention are primarily useful in the desalination of saline solution by reverse osmosis processes operating at low pressures of 250 p.s.i.g. or less, they are also useful in such processes operating at higher pressures and as will be seen hereinafter even at pressures of 600 p.s.i.g., the product rate of the membrane produced according to the process of the present invention is significantly higher of the order of 25% than those produced according to the conventional techniques of U.S. Pat. Nos. 2,133,132 and 3,283,042 and further even in reverse osmosis processes at 1500 p.s.i.g. the performance of such membranes is just as good as that of conventional membranes. Again, a comparison of the membrane under continuous operation is roughly the same as with conventional reverse osmosis membranes.

The process of the present invention thus provides a novel membrane of considerably higher product rate than the known membranes in reverse osmosis at a given separation factor particularly at low operating pressures and it is believed that the membranes produced according to the process of the present invention have a larger effective number of small sized pores on the membrane surface resulting in the superior membrane performance under reverse osmosis operating conditions at low operating pressures.

The present invention thus provides a novel reverse osmosis membrane having in a surface layer thereof a large number of small sized pores such that in the reverse osmosis of an aqueous saline solution containing 3,500 ppm of sodium chloride at a pressure of 250 p.s.i.g. and a mass transfer coefficient (k) on the high pressure side of the membrane of about $45 \times 10^{-4}$ cm. per second, the product rate at a separation factor of about 70 is at least 30 gallons per day per square foot and at a separation factor of about 95 is at least 9 gallons per day per square foot. Preferably the number of pores in the membrane is sufficient to provide a product rate of at least 40 gallons per day per square foot at a separation factor of 70% and at least 11 gallons per day per square foot at a separation factor of about 95%.

Figure 2:
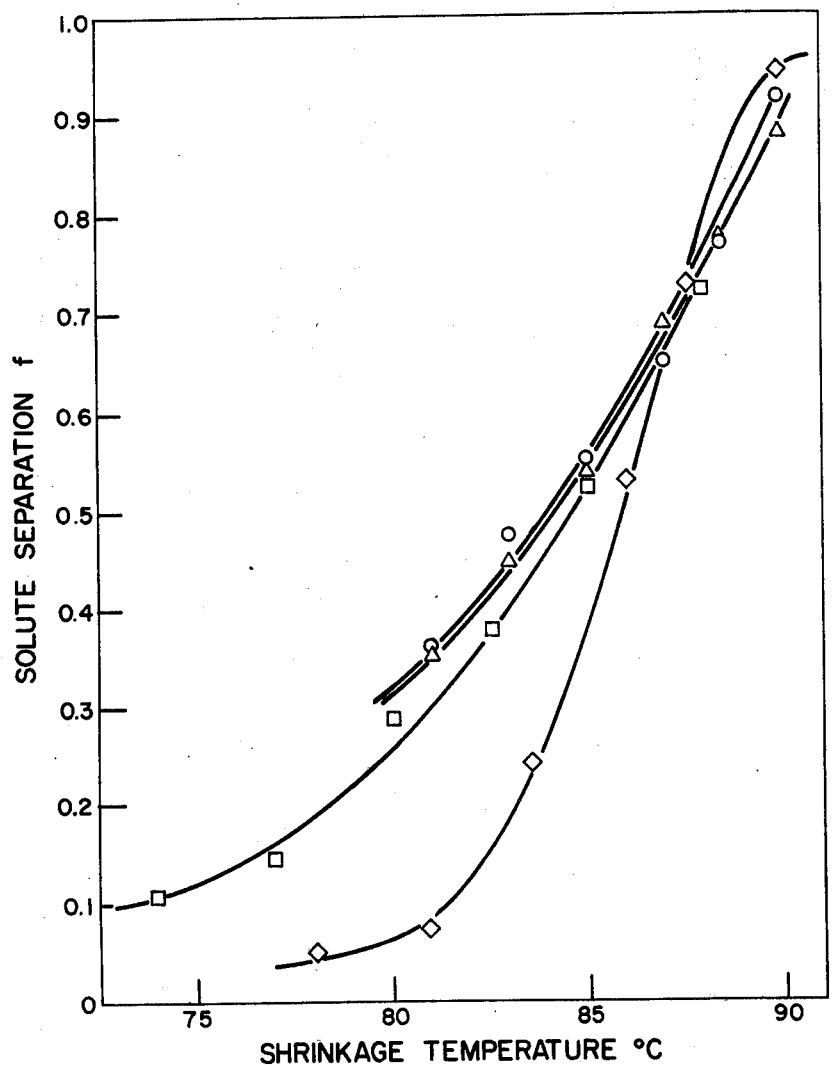
Figure 3:
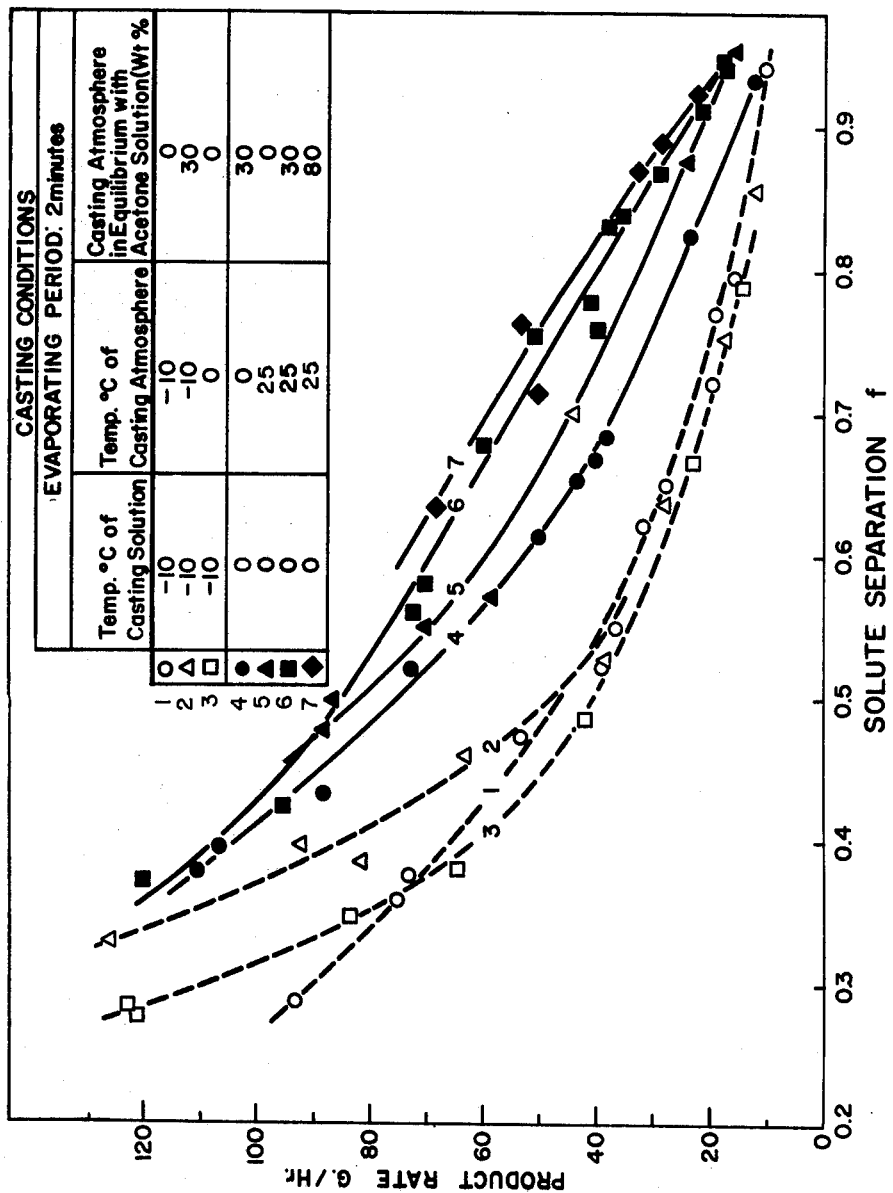
Figure 4:
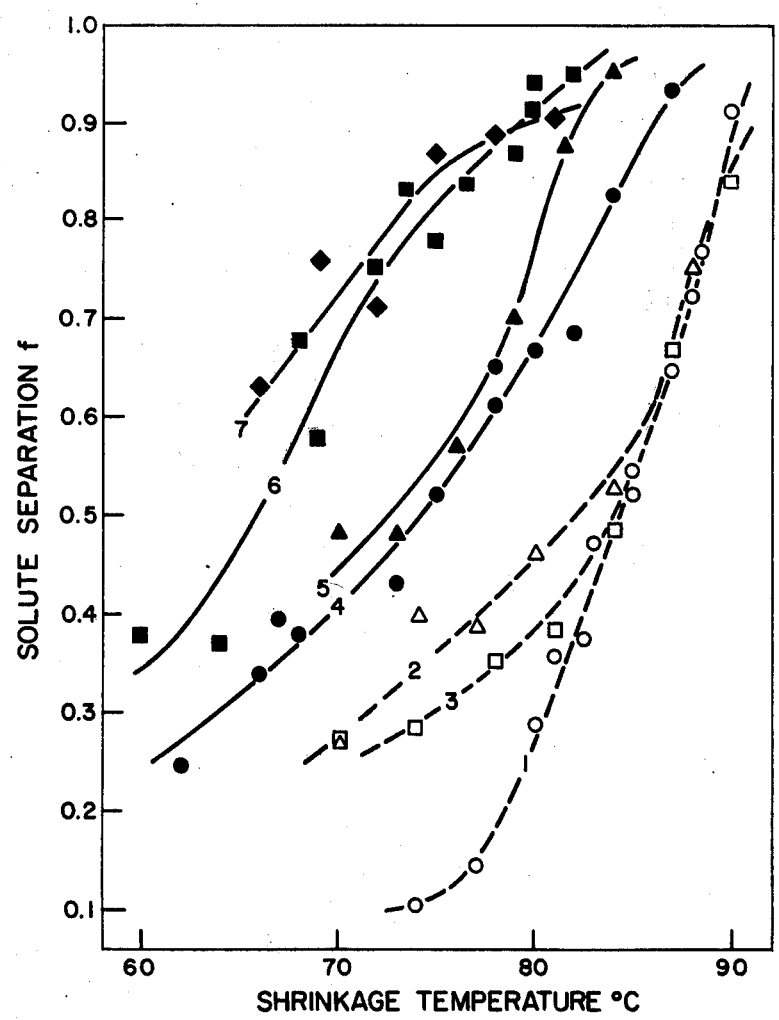
Figure 5:
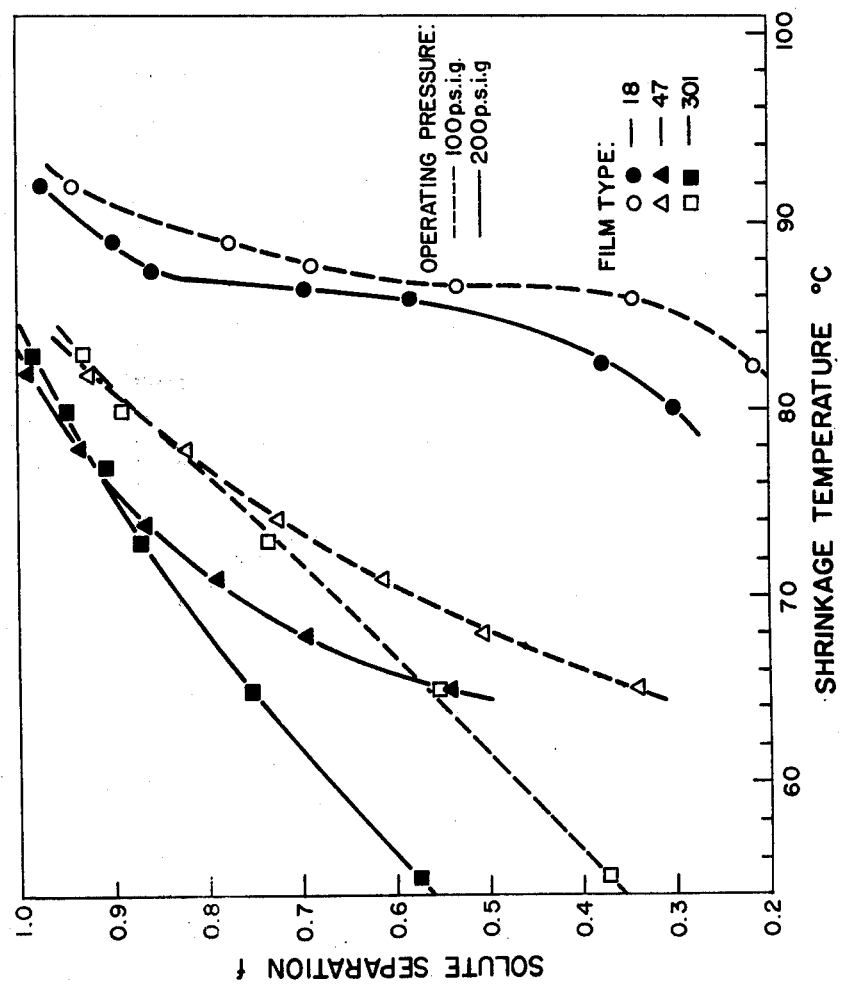
Figure 6:
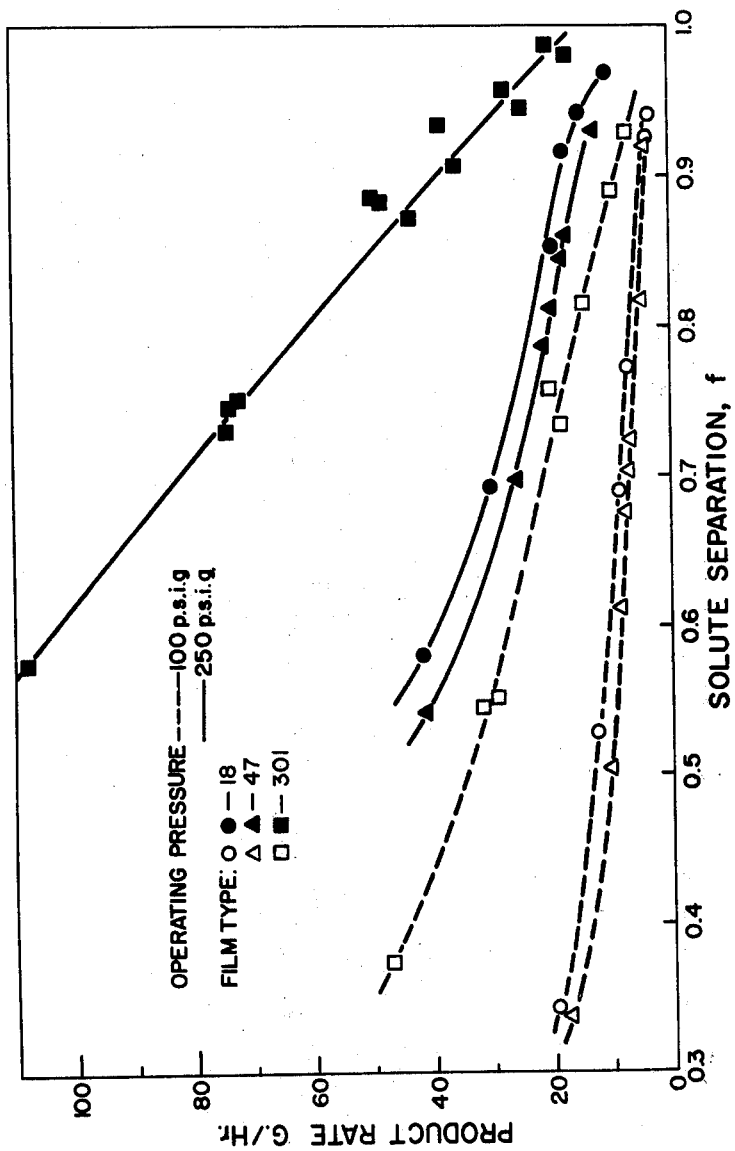
Figure 7:
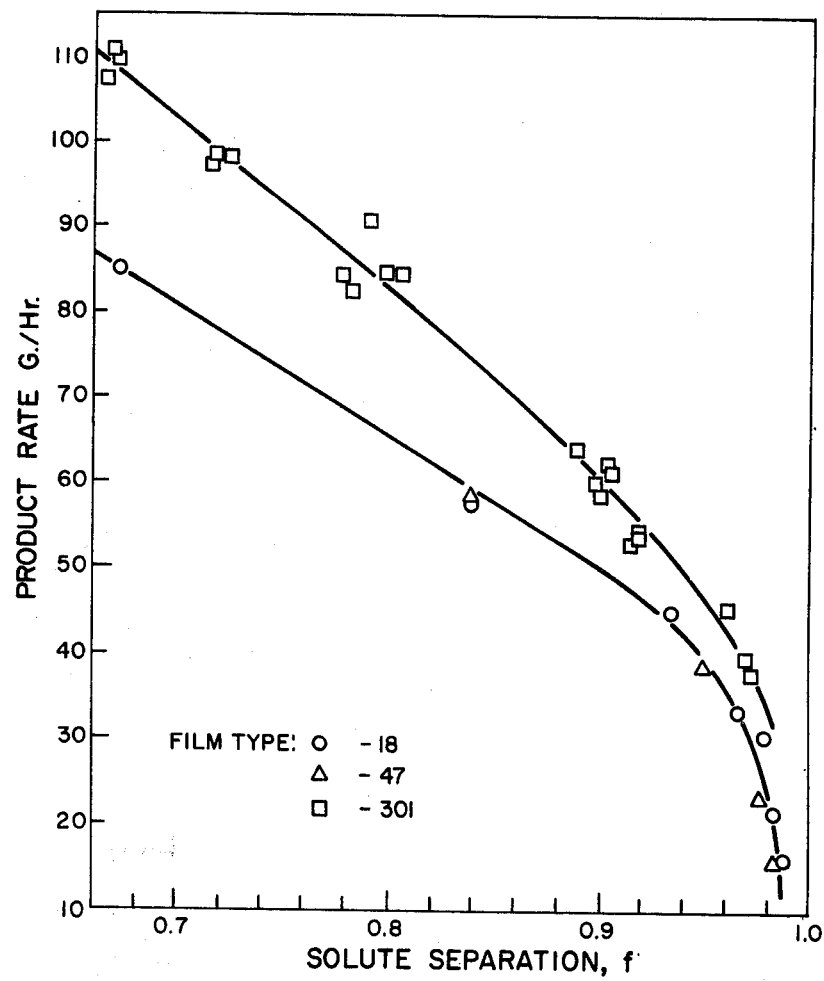
Figure 8:
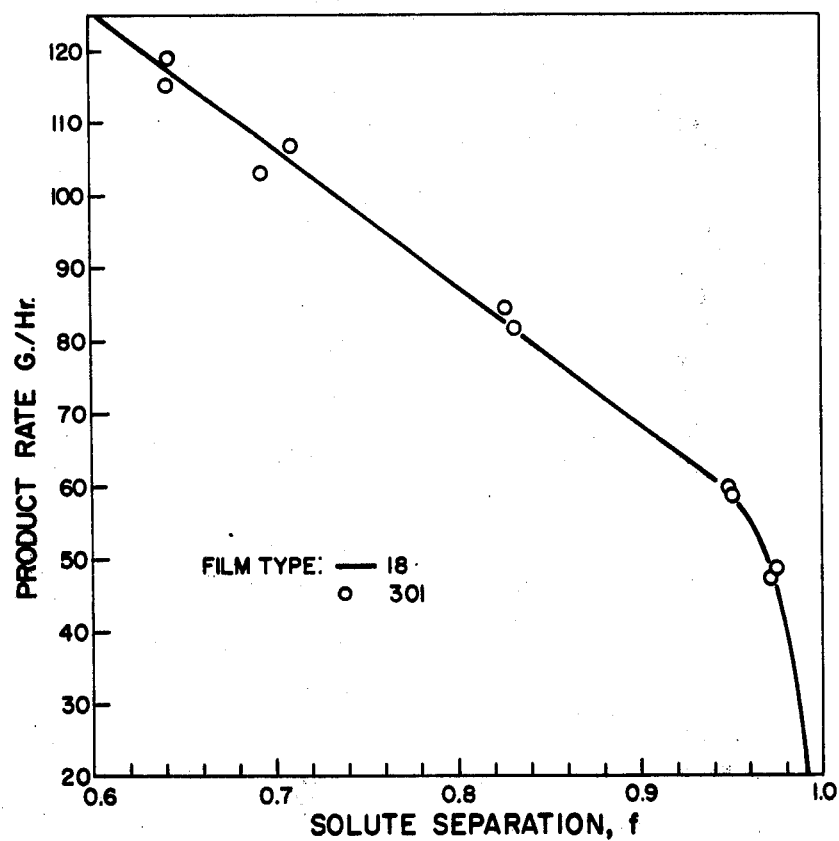
Figure 9:
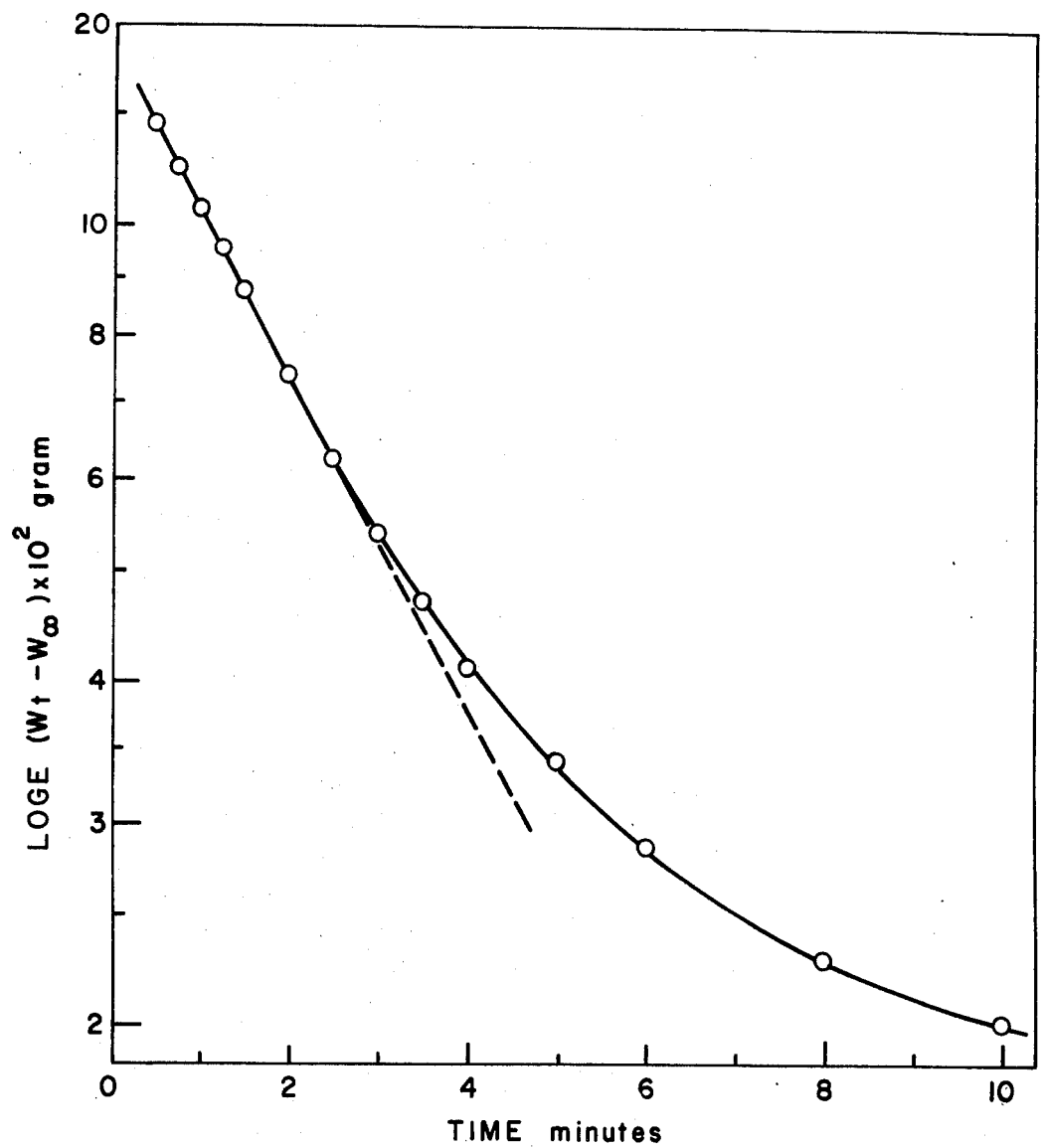
Figure 10:
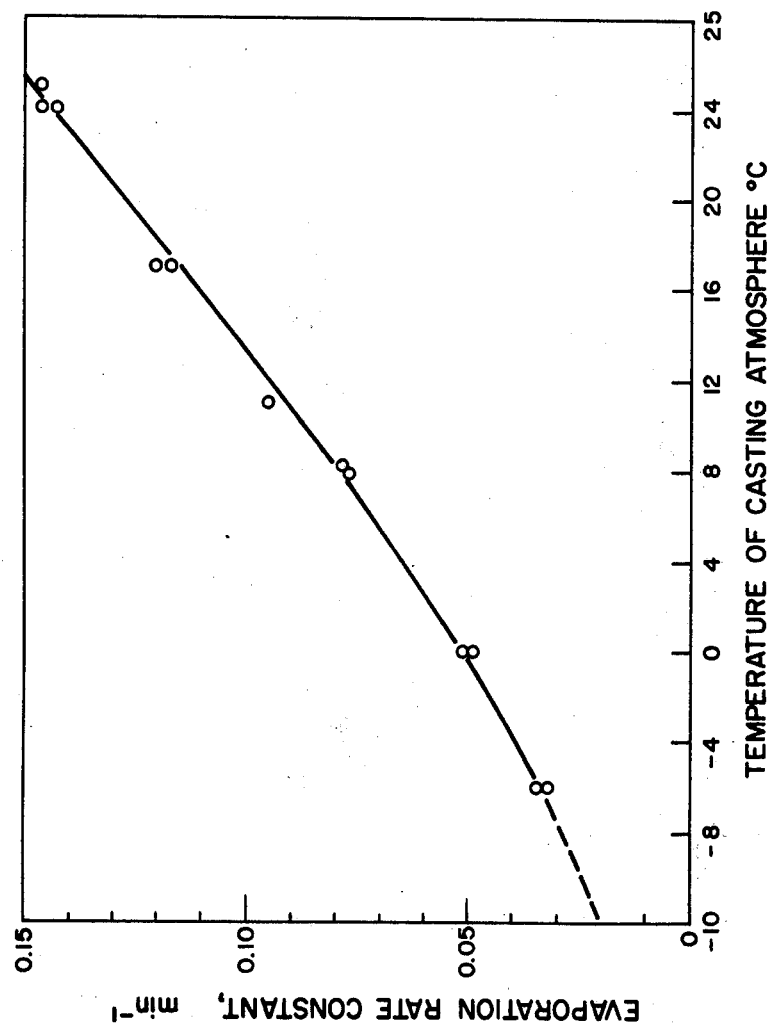

The present invention will be further illustrated by way of the following examples in conjunction with the accompanying drawings in which drawings:

FIG. 1 is a plot of product rate in grams per hour per 7.6 sq. cm. of film area with varying separation factor of the membranes produced in Example 1, FIG. 2 is a plot of separation factor with varying shrinkage temperature of the membranes produced in Example 1, FIG. 3 is a plot of product rate with separation factor of the membranes produced in Example 2 at low reverse osmosis pressures, FIG. 4 is a plot of separation factor with shrinkage temperature of the membranes produced in Example 2 at low reverse osmosis pressures, FIG. 5 is a plot of separation factor with shrinkage temperature of the membranes produced in Example 3 at low reverse osmosis pressures, FIG. 6 is a plot of separation factor with product rate of the membranes produced in Example 3 at low reverse osmosis pressures, FIG. 7 is a plot of separation factor with the product of the membranes produced in Example 3 at reverse osmosis pressures of 600 p.s.i., FIG. 8 is a plot similar to FIG. 7 for reverse osmosis pressures of 1500 p.s.i., FIG. 9 is a plot of the log of solvent loss from a cast film with time;

FIG. 10 is a plot of evaporation rate constant with the temperature of the casting atmosphere at constant temperature of the casting solution, and FIG. 11 is a plot of evaporation rate constant with the percentage of acetone dilution in equilibrium with the casting atmosphere.

EXAMPLE 1

A casting solution made up by admixing acetone, cellulose acetate (acetyl content 39.8%) and an aqueous solution of magnesium perchlorate. The casting solution had the following composition (weight percent).

| Acetone | 68.0 |
|---|---|
| Cellulose Acetate | 17.0 |
| Water | 13.5 |
| Magnesium perchlorate | 1.5 |

The casting solution was cast into a plurality of membranes about 0.004 inches thick by the procedure set forth in FIG. 1 of U.S. Pat. No. 3,283,042 each film being cast at a constant temperature of $-10°$ C. for periods of 1, 2, 4 and 6 minutes. The membranes were shrunk by heating in hot water at different temperatures to give different surface pore structures and hence different level of solute separations at preset operating conditions. All the membranes were initially subjected to a pure water pressure of 300 p.s.i.g. for one hour before use in the reverse osmosis procedure. The reverse osmosis processes were of the short-run type, each lasting about 2 hours and were carried out using aqueous feed solutions containing 3500 ppm sodium chloride at a feed rate of 350 cc ppm and an operating pressure of 250 p.s.i. over a film area of 7.6 sq/cm. and the product rates obtained were corrected to 25° C. using the relative viscosity and density data for pure water. The solute concentrations in the feed and product solutions were determined by specific resistance measurements using a conductivity cell and the accuracy of the separation data is within 1% and the product rate within 3% in all cases. The results obtained are shown in FIGS. 1 and 2 of the accompanying drawings:

FIG. 1 being a plot of product rate in grams per hour per 7.6 sq. cm. of film area with solute separation factor; and FIG. 2 being a plot of solute separation factor against shrinkage temperature.

It will be seen from FIG. 1 that the product rate obtained at a given separation factor is independent of evaporation time and this indicates that a change in evaporation results in no significant change in the effective number of pores on the membrane surface for the particular type of membranes studied.

Referring to FIG. 2 it will be seen that the shrinkage temperature separation factor profile varies with evaporation time and it is considered that FIG. 2 shows clearly that the evaporation time has a significant effect upon the pore size distribution in the surface layer of the cast membrane and provides a means of producing membranes having reproducible product rates and particular separation factors. Thus, as aforesaid, the product rate at a particular separation factor depends upon the solution structure and thus depends inter alia on the composition of the casting solution. As the materials for the casting solution, such as the cellulose acetate, are obtained from varying sources, the product rate at a given separation factor may vary considerably depending upon the source of the materials forming the casting solution. However, when solution structure and evaporation rate remain constant, the evaporation time of the solvent from the cast film may be varied such that when two particular membranes have the same shrinkage temperature profile then the membranes will have the same product rate at the same separation factor.

EXAMPLE 2

Seven different sets of films were made using the same casting solution according to the same techniques as set forth in Example 1 with a constant evaporation time of 2 minutes and ice cold water being used to gell the membrane. The temperature of the casting solution and the conditions of evaporation were varied. Thus, the casting solution was conditioned at different temperatures and the evaporation rate was varied by varying the temperature of the casting atmosphere and the equilibration of acetone vapor in the casting atmosphere. This was achieved by casting the films in a closed atmosphere in equilibrium with different concentrations of aqueous solutions. As in Example 1 the films were shrunk at different temperatures to give different levels of solute separation in the reverse osmosis processes which were conducted in a similar manner as in Example 1. The results obtained are given in FIGS. 3 and 4 in which:

FIG. 3 is a plot of product rate in grams per hour per 7.6 sq. cm. of film area against separation factor, and FIG. 4 is a plot separation factor against shrinkage temperature.

It will be seen from FIGS. 3 and 4 that the membranes may be divided broadly into two groups, membranes 1, 2 and 3 belong to Group 1 and membranes 4, 5, 6, and 7 belong to Group 2.

For the membranes of Group 1 the casting solution temperature was −10° C. and the casting solution temperature for the film in Group 2 was 0° C. It is clear that the product rate of the Group 2 membranes in the reverse osmosis process is substantially higher than that of the Group 1 membranes at any given separation factor showing that a higher casting solution temperature favors the creation of a higher effective number of pores in the membrane and higher product rate.

FIGS. 3 and 4 show there are differences among the membranes within each Group which has been caused by the change in rate of solvent evaporation as a result of variation of two factors namely the difference in temperature between the casting atmosphere and the casting solution and the introduction of acetone vapor into the casting atmosphere. The first factor increases the solvent evaporation rate and the second factor decreases it and while the influence of the evaporation rate on the performance of the membrane in reverse osmosis is more evident in the membranes of Group 2, it can also be seen within the membranes of Group 1, particularly at lower levels of solute separation of less than about 50%.

The membranes 4, 5, 6, and 7 in FIG. 3 are progressively above one another and the shrinkage temperature profile corresponding to these curves in FIG. 4 are progressively shifted to the left indicating the creation of a progressively larger number of smaller size pores on the membrane surface under the conditions of casting resulting ultimately in a more productive reverse osmosis membrane. In particular, compared to the membranes represented by the curve 3, those represented by the curve 4 in FIG. 3 show a much higher product rate and a shrinkage temperature profile shifted substantially to the left. The above data indicates that a higher solution temperature tends to produce more productive reverse osmosis membranes. Further with respect to curves 4 and 5 in FIG. 3, it is clear that the solution temperature and evaporation rate combination represented by curve 4 is not the optimum and a better combination of solution temperature and evaporation rate is illustrated by curve 5. The membranes represented by curve 5 are cast at temperatures of 25° C. where a higher evaporation rate is achieved than at the casting conditions represented by curve 4.

Curves 6 and 7 of FIG. 3 show the evaporation rate obtained under the conditions of casting represented by curve 5 is too high and better results are obtained under conditions which favor a decrease in the evaporation rate to some extent. This was readily done by equilibrating the casting atmosphere at the laboratory temperature with 30% or 80% solution of acetone in water. However, it will be readily seen that the presence of the acetone will not be necessary when the casting atmosphere temperature and the temperature of the casting solution present an optimum evaporation rate, which optimum evaporation rate will depend upon the composition of the casting solution. It will be seen that curve 7 in FIGS. 3 and 4 represents the best membrane obtained with regard to production rate at a given solute separation. However, it will be readily realized that curve 7 does not necessarily represent the optimum conditions for producing a membrane with the optimum production rate for particular solute separation.

While the differences amongst the performances of the membranes represented by the curves within Group 1 are not so well delineated as those within Group 2, the general trends are the same and the solvent evaporation rates for the membranes represented by curves 2 and 3 in FIGS. 3 are probably higher and lower respectively than the evaporation rate for the membranes represented by curve 1. The corresponding performance data would indicate that the lower evaporation rate tends to increase the product rate of the membranes at a given separation factor. With respect to the corresponding shrinkage temperature profiles in FIG. 4, it will be seen that the profiles are essentially identical at separation factors greater than about 50% and below this level the membranes represented by the curve 1 have bigger and more uniform pores and the membranes represented by the curve 2 have smaller and less uniform pores whereas the membranes represented by the curve 3 have a surface pore size and pore size distribution intermediate between the above two cases. This data tends to indicate that the low evaporation rate tends to produce a larger number of smaller size pores on the membrane surface. Also, the fact that the shrinkage temperature profile 3 is located between the profiles 1 and 2 in FIG. 4 and the corresponding product data being also similarly situated at lower separation factors even though the evaporation rates are not of the same order indicates that the evaporation rate is only one of the factors which determine the number, size and distribution of the pores on the membrane surface.

In summary the aforesaid results show that for a given casting solution composition the temperature of the casting solution and the conditions of the solvent evaporation during film formation together constitute an important interconnected variable giving the porous structure of the membrane.

EXAMPLE 3

Three casting solutions were prepared having the composition set forth in Table 1, the casting solutions being designated Batch 18, Batch 47 and Batch 301 respectively.

TABLE 1

| Film casting details | Film Casting Details | | |
|---|---|---|---|
| | Batch 18 | Batch 47 | Batch 301 |
| Casting solution composition, wt.% | | | |
| Cellulose acetate (acetyl content 39.8%) | 17 | 25 | 17 |
| Acetone | 68 | 45 | 68 |
| Magnesium perchlorate | 1.5 | — | 1.5 |
| Water | 13.5 | — | 13.5 |
| Formamide | — | 30 | — |
| Casting solution temperature, °C | −10 | 23–25 | 0 |
| Temp. of casting atmosphere, °C | −10 | 23–25 | 23–25 |
| Casting atmosphere | air | ambient air | ambient air in equilibrium with aqueous solution of wt.% acetone |
| Solvent evaporation time, min. | 4 | 1 | 2 |
| Duration of film-setting in ice-cold water, hour | ~1 | ~1 | ~1 |
| Nominal film thickness, inch | 0.004 | 0.004 | 0.004 |

The solutions were cast into membranes according to the process set forth in FIG. 1 of U.S. Pat. No. 3,283,042 with the conditions set forth in Table 1. In Table 1 the casting solution composition is the same for Batch 18 and Batch 301 membranes and is different from that used in the production of Batch 47 membranes, the conditions of solvent evaporation during film formation for the Batch 301 membranes being different from those used from the other two types of membranes. The membranes obtained from each batch were shrunk at different temperatures to give a different surface pore structure and hence different levels of solute separations at preset operating conditions. The effective area of the membrane used in the subsequent reverse osmosis process is 7.6 sq. cm. and all the membranes were initially subjected to an initial pressure treatment at 300 p.s.i.g. for an hour prior to their use in reverse osmosis processes. All these reverse osmosis processes were carried out using an aqueous sodium chloride feed solution, the feed concentrations being 1500 ppm sodium chloride, the reverse osmosis process being of the short run type and lasting about 2 hours in each case. The product rates are corrected to 25° C. using the relative viscosity and density data for pure water. Again, the solute concentrations in feed and product solutions were determined either from specific resistance measurements using a conductivity cell or from refractive index readings using a Bausch and Lomb refractometer. The results obtained are given in FIGS. 5 and 6.

FIG. 5 is a plot of separation factor against shrinkage temperature, and FIG. 6 is a plot of separation factor against product rate in grams per hour per 7.6 cm² of film area.

In each Figure, two operating pressures were effected, namely 100 p.s.i.g. and 250 p.s.i.g. in the reverse osmosis process, the feed rate being 500 cc. per minute. It will be seen from the relative positions and shapes of the shrinkage temperature profiles in FIG. 5 that the Batch 301 membranes have a smaller size and less uniform pore size than the conventional Batch 18 and Batch 47 membranes. Further, it will be seen from FIG. 6 that the productivity of Batch 301 membranes at any given separation factor, is 100 to 200% higher than either of the conventional Batch 18 or Batch 47 membranes. Solute separations greater than 70% are of practical utility in many brackish water conversion processes.

Further results are given in the following Table 2 with respect to operating pressures from 40 to 250 p.s.i.g. with a feed rate of 300 cc. per minute in the reverse osmosis process.

Table 2.

Comparative Performance of Porous Cellulose Acetate Membranes for Brackish Water Desalination.

System : Sodium Chloride - Water
Feed conc. : 1500 ppm NaCl
Feed rate : 300 cc/minute
$k = 50 \times 10^{-4}$ cm/sec.

| Operating pressure p.s.i.g. | Batch 18 | | Batch 47 | | Batch 301 | |
|---|---|---|---|---|---|---|
| | Solute sepn., % | Product rate gal. day. sq. ft. | Solute sepn., % | Product rate gal. day. sq. ft. | Solute sepn., % | Product rate gal. day. sq. ft. |
| 40 | 83 | 0.77 | 84.5 | 0.86 | 83.4 | 1.87 |
| 70 | 71.3 | 3.8 | 89.5 | 1.9 | 74.6 | 7.6 |
|  | 89.0 | 1.8 | 94.8 | 1.5 | 84.4 | 4.9 |
|  | 92.0 | 1.6 |  |  | 90.0 | 3.6 |
| 100 | 77.3 | 5.4 | 72.4 | 4.7 | 73.5 | 14.0 |
|  | 92.3 | 2.9 | 90.5 | 4.5 | 81.6 | 10.9 |
|  | 94.0 | 2.3 | 92.5 | 2.7 | 89.0 | 7.3 |
|  |  |  |  |  | 93.0 | 5.2 |
| 150 | 76.4 | 9.3 | 75.0 | 9.0 | 79.6 | 20.5 |
|  | 83.3 | 8.2 | 77.6 | 7.5 | 86.6 | 16.4 |
|  | 95.0 | 4.7 | 95.6 | 4.7 | 92.2 | 9.6 |
|  |  |  |  |  | 95.6 | 8.0 |
| 200 | 81.5 | 12.2 | 78.4 | 12.0 | 70.2 | 46.1 |
|  | 88.0 | 10.8 | 81.2 | 10.8 | 84.0 | 26.9 |
|  | 96.3 | 6.2 | 97.5 | 6.2 | 88.6 | 22.0 |
|  |  |  |  |  | 93.8 | 14.9 |
|  |  |  |  |  | 97.3 | 10.6 |
| 250 | 85.4 | 15.1 | 81.2 | 15.3 | 74.8 | 56.7 |
|  | 91.7 | 13.7 | 86.2 | 13.1 | 87.2 | 33.6 |
|  |  |  |  |  | 90.6 | 27.6 |
|  |  |  |  |  | 94.6 | 18.9 |

It will be seen from Table 2 that again the product is 100 to 150% higher than the product rate obtained with either of the conventional Batch 18 of Batch 47 membranes in the separation factor range 70–95% which is of practical utility in brackish water desalination. It will be further seen from FIGS. 5 and 6 that the Batch 301 membranes have a larger effective number of smaller size pores on the membrane surface resulting in superior membrane performance under reverse osmosis operating conditions at low operating temperatures.

EXAMPLE 4

Example 3 was repeated with the aforesaid membranes, the reverse osmosis process being operated at pressures of 600 and 1500 p.s.i.g. respectively. The concentration of the feed sodium chloride solution was respectively for said pressures 0.5 weight percent and 0.5 molal and the membranes were subjected to an initial pressure treatment with cold water at pressures respectively of 700 and 1700 p.s.i.g. The results obtained are given in FIGS. 7 and 8.

FIG. 7 is a plot of separation factor against product rate at a pressure of 600 p.s.i.g. and FIG. 8 is a similar plot for a pressure of 1500 p.s.i.g.

The feed rate during the reverse osmosis process in both cases was 250 cc. per minute. It will be seen from FIGS. 7 and 8 that at 600 p.s.i.g. the product rate of the Batch 301 membrane is significantly higher by about 25% or more than the conventional Batch 18 membrane and at 1500 p.s.i.g. the product rate of the Batch 301 membrane is just as good as the conventional Batch 18 membranes which indicates that higher operating pressures tend to close the smaller size pores initially created in the Batch 301 membranes during the casting.

In general therefore it will be seen from Examples 3 and 4 that the productivity of the Batch 301 membranes in the reverse osmosis at low pressure is 100 to 150% higher than either of the Batch 18 or Batch 47 type membranes at any given separation factor in the range 70 to 95% and at operating pressures of 250 p.s.i.g. or less using low concentrations of aqueous sodium feed solution.

EXAMPLE 5

A series of casting solutions were made up having the composition as set forth in Table 3 following. The casting solutions being designated Types 4 to 403 respectively as set forth in Table 3. The solutions were cast into membranes according to the process set forth in FIG. 1 of U.S. Pat. No. 3,283,042 with the conditions set forth in Table 3. The membranes obtained were shrunk at different temperatures to give a different surface pore structure and hence different levels of solute separations during reverse osmosis at preset operating conditions. The effective area of the membrane used in the subsequent reverse osmosis process was 7.6 sq. cm. and all the membranes were initially subjected to an initial pressure treatment at 300 p.s.i.g. for an hour prior to their use in the reverse osmosis processes. All these reverse osmosis processes were carried out using an aqueous sodium chloride feed solution, the concentration of sodium chloride in the solution being 3500 ppm, the feed pressure being 250 p.s.i.g. and the mass transfer coefficient from the high pressure side of the membrane being approximately $45 \times 10^{-4}$ cm. per second. The results obtained are shown in Table 3 in which the prior art Batch 18 and Batch 47 membranes are shown for comparison purposes.

TABLE 3

| Membrane Casting Details | Batch 18 | Batch 47 | Type 4 | Type 5 | Type 6 | Type 6A | Type 6B | Type 7 |
| --- | --- | --- | --- | --- | --- | --- | --- | --- |
| Casting solution composition, wt. % cellulose acetate (acetyl content 39.8%) | 17.0 | 25.0 | 17.0 | 17.0 | 17.0 | 17.0 | 17.0 | 17.0 |
| Acetone | 68.0 | 45.0 | 68.0 | 68.0 | 68.0 | 68.0 | 68.0 | 68.0 |
| Magnesium Perchlorate | 1.5 | — | 1.5 | 1.5 | 1.5 | 1.5 | 1.5 | 1.5 |
| Water | 13.5 | — | 13.5 | 13.5 | 13.5 | 13.5 | 13.5 | 13.5 |
| Formamide | — | 30.0 | — | — | — | — | — | — |
| Casting Solution, temperature, °C. | −10 | 24 | 0 | 0 | 0 | 0 | 0 | 0 |
| Temperature of Casting Atmosphere, °C. | −10 | 24 | 0 | 24 | 24 | 18 | 18 | 24 |
| Nature of Casting Atmosphere | ambient air | ambient air | ambient air in equilibrium with 30% acetone solution in water. | ambient air | ambient air in equilibrium with 30% acetone solution in water. | ambient air | ambient air | ambient air in equilibrium with 80% acetone solution in water. |
| Solvent evaporation time, minutes | 4 | ½ | 2 | 2 | 2 | 1 | 2 | 2 |
| Duration of film setting in ice-cold water | >1 hr | >1 hr | >1 hr | >1 hr | >1 hr | >1 hr | >1 hr | >1 hr |
| Nominal film thickness, inch | 0.005 | 0.005 | 0.005 | 0.005 | 0.005 | 0.005 | 0.005 | 0.005 |

| Membrane Casting Details | Type 8 | Type 400A | Type 400B | Type 401 | Type 402 | Type 403 |
| --- | --- | --- | --- | --- | --- | --- |
| Casting solution composition, wt. % cellulose acetate (acetyl content 39.8%) | 17.4 | 17.0 | 17.0 | 17.0 | 17.0 | 17.0 |
| Acetone | 67.2 | 56.0 | 56.0 | 58.0 | 60.0 | 54.0 |
| Magnesium perchlorate | 1.52 | — | — | — | — | — |
| Water | 13.88 | — | — | — | — | — |
| Formamide | — | 27.0 | 27.0 | 25.0 | 23.0 | 29.0 |
| Casting Solution, temperature, °C. | 24 | 24 | 24 | 24 | 24 | 24 |
| Temperature of Casting Atmosphere, °C. | 24 | 24 | 24 | 24 | 24 | 24 |
| Nature of Casting Atmosphere | ambient air in equilibrium with 30% acetone solution in water | ambient air in equilibrium with 30% acetone solution in water | ambient air | ambient air in equilibrium with 30% acetone solution in water | ambient air in equilibrium with 30% acetone solution in water | ambient air in equilibrium with 30% acetone solution in water |
| Solvent evaporation time, minutes | 2 | ½ | ½ | ½ | ½ | ½ |
| Duration of film setting in ice-cold water | >1 hr | >1 hr | >1 hr | >1 hr | >1 hr | >1 hr |
| Nominal film thickness, Inch | 0.005 | 0.005 | 0.005 | 0.005 | 0.005 | 0.005 |

| | MEMBRANE PERFORMANCE IN REVERSE OSMOSIS | | | | | | | |
| --- | --- | --- | --- | --- | --- | --- | --- | --- |
| | MEMBRANE PRODUCTIVITY, gallons/day/sq. ft. | | | | | | | |
| Solute Separation, % | Batch 18 | Batch 47 | Type 4 | Type 5 | Type 6 | Type 6A | Type 6B | Type 7 |
| 70 | 19.2 | 20.3 | 29.1 | 34.6 | 43.1 | 44.3 | 38.1 | 46.3 |

TABLE 3-continued

| | | | | | | | |
|---|---|---|---|---|---|---|---|
| 80 | 13.5 | 15.1 | 20.7 | 26.0 | 31.5 | 32.3 | 28.4 | 34.3 |
| 90 | 8.9 | 11.3 | 12.3 | 17.6 | 19.4 | 20.4 | 19.0 | 21.0 |
| 95 | 7.0 | 8.2 | 8.6 | 12.5 | 13.8 | 14.4 | 14.0 | 14.4 |

| Solute Separation, % | Type 8 | Type 400A | Type 400B | Type 401 | Type 402 | Type 403 |
|---|---|---|---|---|---|---|
| 70 | 40.8 | 48.2 | 43.1 | 40.1 | 30.3 | 37.3 |
| 80 | 29.1 | 35.7 | 31.1 | 29.6 | 22.2 | 28.8 |
| 90 | 17.1 | 22.4 | 18.3 | 18.4 | 13.6 | 17.1 |
| 95 | 11.3 | 15.5 | 12.3 | 12.7 | 9.3 | 12.4 |

It will be seen from Table 3 that in the preservation of the Types 5, 6, 6A, 6B and 7 membranes, a difference was maintained between the temperature of the casting atmosphere and the temperature of the casting solution and further with some of the membranes acetone vapor was present in the casting atmosphere in accordance with one aspect of the present invention. It will be noted that the product rate increased at a separation factor of 70% from 19.2 gallons per day per sq. ft. to over 30 gallons per day per sq. ft. and with the better membranes to over 40 gallons per day per sq. ft. and at a separation factor of about 95%, the product rate increased from 7 gallons per day per sq. ft. to above 12 gallons per day per sq. ft. with the better membranes having a product rate of over 14 gallons per day per sq. ft. With the Types 4, 8, 400A, 400B, 401, 402 and 403 membranes the solution structure was modified in accordance with another aspect of the present invention by maintaining the concentration of cellulose acetate in the casting solution below 20% and the temperature of the casting solution at least 0° C. It will be noted that the product rate at a separation factor of 70% increased from 19 gallons per day per sq. ft. for the Batch 18 membrane to 29 gallons per day per sq. ft. for the Type 4 membrane and the product rate increased from 20 gallons per day per sq. ft. for the Batch 47 membrane to over 30 gallons per day per sq. ft. for the Types 8, 400A, 400B, 401, 402 and 402 membranes and with the better membranes to over 40 gallons per day per sq. ft. Further at a separation factor of 95% the product rate increased from 7 gallons per day per sq. ft. for the Batch 18 type membrane to 8.6 gallons per day per sq. ft. for the Type 4 membrane and increased from 8.2 gallons per day per sq. ft. for the Batch 47 type membrane to over 9 gallons per day per sq. ft. for the Type 401 type membrane and for the better membrane, over 12 gallons per day per sq. ft.

EXAMPLE 6

A casting solution was prepared having the following composition (by weight):

| | |
|---|---|
| Acetone | 68% |
| Cellulose Acetate (acetyl content equals 39.8%) | 17% |
| Water | 13.5% |
| Magnesium perchlorate | 1.5% |

Films were cast from the solution in a similar manner as in the previous examples at different casting solution temperatures and casting atmosphere temperatures or at the same casting solution and casting atmosphere temperatures with acetone in the casting atmosphere, the films being cast onto small glass plates of approximately 17 mm × 38 mm in size with side runners to give the required film thickness. The thickness of the side runner was the same as that generally used for making membranes for reverse osmosis processes. The casting solution and the glass plates were maintained at the required solution temperature for at least 24 hours prior to casting.

The evaporation rate measurements were carried out at a constant temperature of surroundings, either in a cold room or in the laboratory as required. The casting solution was spread on the glass plate by moving an inclined knife on the side runners and immediately transferred to an analytical balance. As the acetone evaporated, the weight (in grams) of the plate containing the membrane decreased and this change in weight was followed as a function of time. The first weight was noted 30 seconds after casting and the subsequent weights were noted in 15 second intervals for a few minutes, the weight at any time t being designated as $W_t$. As the changes in weight became less, the weights were noted after longer time intervals, until essentially constant weight ($W_\infty$) was reached. The weight determinations were continued for about an hour, even though the changing weight became progressively insignificant after the first 10 minutes. Such measurements were also made while solvent evaporation took place into an atmosphere of acetone vapor. Prior to the measurements, the closed space of the analytical balance was equilibrated with the required concentration of aqueous acetone solution placed in several shallow open containers for one to two hours.

The general trend of the rapid decrease in solvent loss with time is expressed by the evaporation rate measurements which can conveniently be represented by passing the values of log ($W_t - W_\infty$) in grams vs. t in minutes. A typical set of results is shown in FIG. 9 and it will be seen that the evaporation rate curve consists of an initial linear part followed by a nonlinear part. The linear part of the curve it is believed indicates the constancy of the mechanism governing evaporation rate in the early stages of the casting process when it may be expected that the solvent loss from the surface of the membrane is compensated by solvent diffusion to the film surface from underneath. In any case since the cloud point, i.e. polymer phase separation, in the surface region may be expected to be reached soon after evaporation starts, the initial part of the curve is all important in representing the developing of the formation of the porous structure of the surface region. Because the curve is linear in this part it is also precisely defined. For a given area of film surface the linear part of the evaporation curve of FIG. 9 may be represented by the equation $$W_t - W_\infty = (W_o - W_\infty)e^{-bt}$$

where $W_t$ and $W_\infty$ are as set forth heretofore and $W_o$ is the initial weight of the plate containing the film which is obtained by extrapolating the curve of FIG. 9 to zero time. $b$ is a constant which is referred to as the evaporation rate constant (minute$^{-1}$).

In one set of experiments the temperature of the casting solution was maintained at 0° C. and the temperature of the casting atmosphere was varied and the evaporation rate constant was determined at the various temperatures. The results obtained are shown in FIG. 10. In another set of experiments the casting atmosphere was maintained at 0° C., the temperature of the casting atmosphere was at ambient temperature 24° C., and the amount of acetone in the casting atmosphere was varied. The results obtained are shown in FIG. 11. It will be seen from FIG. 10 that the evaporation rate constant increases linearly with increase in temperature of the casting atmosphere and it will be seen from FIG. 11 that the presence of acetone in the casting atmosphere reduces the evaporation rate constant and this reduction becomes progressively less steep with increase in such duration of the casting atmosphere with acetone. Thus, the introduction of acetone into the casting atmosphere provides a sensitive means of reducing the evaporation rate constant which can be combined with the variation of the temperature of the casting atmosphere itself to suit particular requirements.

We claim:

1. In the production of a porous membrane for use in the separation of solutes from solvents by reverse osmosis which comprises:
    dissolving a film forming cellulosic ester or ether and a water soluble pore producing compound in a volatile organic solvent to form a casting solution,
    casting said solution on a casting surface in a casting atmosphere to form a membrane of substantially uniform thickness,
    evaporating a portion of said organic solvent from said cast membrane and
    immersing said cast membrane in cold water to effect gelation thereof and removal of said pore producing compound therefrom,
    the improvement in which said membrane is cast from a solution containing 10-20% film forming compound without forced air circulation while maintaining a casting solution temperature of 0° C or greater and a temperature differential of from 8° C to 27° C between said atmosphere and the temperature of said casting solution on said casting surface, the temperature of said atmosphere being the higher, so as to adjust the evaporation rate of the solvent from said cast membrane towards an optimum for the membrane casting solution, thereby to produce a membrane capable of allowing a higher product rate during the reverse osmotic separation at essentially the same separation factor.

2. A process as claimed in claim 1 in which the atmosphere into which the membrane is cast initially contains vapor of said organic solvent.

3. A process as claimed in claim 1, in which the temperature of said atmosphere is in the range of 8°–18° C. higher than the temperature of the casting solution.

4. A process as claimed in claim 1 in which the cellulosic compound is a cellulosic ester.

5. A process as claimed in claim 1 in which the cellulosic compound is cellulose acetate.

6. The process as claimed in claim 1 in which the pore producing compound is a perchlorate salt.

7. A process as claimed in claim 1 in which the pore producing compound is an aqueous solution of magnesium perchlorate.

8. A process as claimed in claim 7 in which the film is subsequently heated in water to reduce its porosity.

9. A process as claimed in claim 8 in which the water temperature is from 70° to 90° C.

10. A process as claimed in claim 7, in which the film is subsequently subjected to a pure water pressure treatment.

11. A process as claimed in claim 10 in which the atmosphere contains acetone vapor in an amount in equilibrium with an aqueous solution of 30 to 80 weight percent acetone.

12. A process as claimed in claim 7, in which the casting solution is cast at a temperature of about 0° C. into an atmosphere at a temperature in the range of about 20° to 25° C.

13. A process as claimed in claim 1 in which the casting solution comprises a solution in acetone of cellulose acetate and an aqueous solution of magnesium perchlorate, the weight ratio of acetone to cellulose acetate being in the range 2:1 to 6:1 and the weight ratio of the aqueous solution to the cellulose acetate being in the range 3:1 to 1:3, the solution being cast at a film thickness of 0.003 to 0.006 inches.

14. A process as claimed in claim 1, wherein the temperature of the solution is between 18° C and ambient temperature.

15. A process as claimed in claim 14 in which the film forming compound is cellulose acetate.

16. A reverse osmosis membrane having a large number of small size pores in the surface layer produced by the method of claim 1.

* * * * *